United States Patent
Lataste et al.

(10) Patent No.: US 8,812,557 B2
(45) Date of Patent: Aug. 19, 2014

(54) DATABASE AND A METHOD FOR OBTAINING THE ADDRESS OF A QUALITY OF SERVICE AND CHARGING CONTROL ENTITY IN AN IMS NETWORK USING SUCH A DATABASE

(75) Inventors: Sandrine Lataste, Paris (FR); Steve Tsang-Kwong-U, Meudon (FR)

(73) Assignee: Orange, Paris (FR)

(*) Notice: Subject to any disclaimer, the term of this patent is extended or adjusted under 35 U.S.C. 154(b) by 15 days.

(21) Appl. No.: 12/680,629

(22) PCT Filed: Sep. 26, 2008

(86) PCT No.: PCT/FR2008/051737
§ 371 (c)(1),
(2), (4) Date: Mar. 29, 2010

(87) PCT Pub. No.: WO2009/050395
PCT Pub. Date: Apr. 23, 2009

(65) Prior Publication Data
US 2010/0223282 A1 Sep. 2, 2010

(30) Foreign Application Priority Data
Sep. 28, 2007 (FR) ................................. 07 57962

(51) Int. Cl.
*G06F 17/30* (2006.01)
(52) U.S. Cl.
USPC ............................. 707/802; 707/769; 709/203

(58) Field of Classification Search
USPC .......... 707/672, 668, E17.044, 766, 783, 785, 707/787, 912, 917, 922, 627, 769, 802; 709/203, 206, 227, 228; 715/700, 968
See application file for complete search history.

(56) References Cited

U.S. PATENT DOCUMENTS

| | | | |
|---|---|---|---|
| 7,778,231 B2 * | 8/2010 | Ku et al. ....................... | 370/338 |
| 2004/0073928 A1 | 4/2004 | Alakoski et al. | |
| 2006/0136557 A1 * | 6/2006 | Schaedler et al. ............ | 709/203 |
| 2006/0258369 A1 * | 11/2006 | Burroughs et al. ......... | 455/456.1 |
| 2007/0174400 A1 * | 7/2007 | Cai et al. ...................... | 709/206 |
| 2008/0177889 A1 * | 7/2008 | Beyer et al. .................. | 709/230 |
| 2009/0017796 A1 * | 1/2009 | Foti ............................. | 455/414.1 |
| 2009/0077181 A1 * | 3/2009 | Chen ............................ | 709/206 |
| 2010/0091671 A1 * | 4/2010 | Lidstrom et al. ............. | 370/252 |
| 2011/0128907 A1 * | 6/2011 | Kvernvik ..................... | 370/328 |

FOREIGN PATENT DOCUMENTS

| EP | 1 748 596 | 1/2007 |
|---|---|---|
| WO | WO 2007/002421 A1 | 1/2007 |
| WO | WO 2007/090463 | 8/2007 |
| WO | WO 2007/090463 A1 | 8/2007 |

OTHER PUBLICATIONS

"TS 23.203, Policy and charging control architecture, Release 7", 3rd Generation Partnership Project (3GPP); Technical Specification, vol. 23, No. V0.3.1, pp. 1-45, Jan. 1, 2006.

(Continued)

*Primary Examiner* — Greta Robinson
(74) *Attorney, Agent, or Firm* — Knobbe Martens Olson & Bear LLP (57) ABSTRACT

A database (51) accessible in an IMS network and including at least one record including: an identifier of a terminal (10) in a transport plane; an identifier of said terminal (10) in a signaling plane; and at least one address of a quality of service and charging control entity (40) in said network.

11 Claims, 8 Drawing Sheets

(56) References Cited

OTHER PUBLICATIONS

"TR 23.803, evolution of policy control and charging, Release 7", 3rd Generation Partnership Project (3GPP); Technical Report, vol. 23, No. V7.0.0, pp. 1-30, Sep. 1, 2005.

3GPP TR 33.978, V6.6.0 (Dec. 2006). Security aspects of early IP Multimedia Subsystem (IMS) (Release 6). 3rd Generation Partnership Project, Technical Specification Group Services and System Aspects, pp. 9-10.

3GPP TS 23.203, V7.3.0 (Jun. 2007). Policy and charging control architecture (Release 7). 3rd Generation Partnership Project, Technical Specification Group Services and System Aspects, pp. 20-29.

Cheshire, et al. Apr. 16, 2008. NAT Port Mapping Protocol (NAT-PMP), draft-cheshire-nat-pmp-03.txt, in 28 pages.

Notification of the First Office Action and English translation of First Office Action mailed Jun. 5, 2012, in corresponding Chinese Application No. 200880105274.X, in 6 pages.

Notice of Reasons for Rejection mailed Feb. 5, 2013, in corresponding Japanese Application No. 2010-526348, in 4 pages.

Final Notice of Reasons for Rejection mailed Jun. 4, 2013, in corresponding Japanese Application No. 2010-526348, in 5 pages.

* cited by examiner

DATABASE AND A METHOD FOR OBTAINING THE ADDRESS OF A QUALITY OF SERVICE AND CHARGING CONTROL ENTITY IN AN IMS NETWORK USING SUCH A DATABASE

RELATED APPLICATIONS

This is a U.S. National Phase Application under 35 USC §371 of International Application PCT/FR2008/051737, filed on Sep. 26, 2008.

This application claims the priority of French application Ser. No. 07/57962 filed on Sep. 28, 2007, and the content of which is hereby incorporated by reference.

BACKGROUND OF THE INVENTION

The field of the invention is that of telecommunications networks conforming to the IP Multimedia Subsystem (IMS) architecture defined by the Third Generation Partnership Project (3GPP).

IMS Release 7 defines Policy and Charging Rules Function (PCRF) entities for quality of service and charging control. When a call is set up in the IMS network, a Proxy Call Session Control Function (P-CSCF) entity sends the PCRF a request to communicate information on the application session, the PCRF subsequently using this information to make a quality of service (QOS) and charging decision on activation of the resources for the session.

From this point of view, the P-CSCF entity behaves like an application function (AF), also referred to in this document as an application entity.

On reception of this request the PCRF identifies the transmission links on which the application session impacts and defines a set of policy rules for them.

The above-mentioned standard assumes that during resource activation the termination point in the transport plane, namely the gateway behind which the terminal accesses the IMS network (Gateway GPRS Support Node (GGSN) in a UMTS network, packet data gateway (PDG) entity in an I-WLAN network), selects the PCRF contacted by the application entity AF at the time of setting up the session.

From this point of view the gateway behaves like a Policy and Charging Enforcement Function (PCEF) implementing the QOS and charging policy.

To be more precise, sections 6.2.2.1 and 6.2.2.3 of the document TS 23.203V7.3.0 specify methods of selection of the PCRF by the gateway and by the application entity AF, respectively:

the gateway uses the Packet Data Network (PDN) and information on the identity of the user, for example their IMSI or MSISDN; and the application entity AF uses the IP address of the user terminal or another identifier of the terminal.

It is clear to the person skilled in the art that it is necessary for the information used by the gateway and the application entity AF to be identical or well synchronized so that it is certain they contact the same PCRF.

The current standard does not guarantee this. A solution envisaged by certain manufacturers is to use the IP address of the user terminal as the PCRF selection criterion. This solution is unsatisfactory since it does not make it possible to select the same PCRF if the IP address of the user terminal as seen by the gateway is different from that as seen by the application entity AF, especially if the network address is masked by the use of a mobility protocol of the Mobile IP type.

The document WO 2007/090463 describes a method aiming to solve this problem. In that method, the gateway initially selects a PCRF, after which the application function AF selects an available PCRF on the basis of the IP address assigned to the user terminal. If the PCRF selected is already serving the terminal (identified by its IP address), then that PCRF is used for the session. If not, the PCRF selected in error sends back an error message and the application function AF selects another PCRF, again on the basis of the IP address of the terminal, and this process continues until it is the PCRF serving the terminal that is selected.

That method does not guarantee that the application function AF will eventually select the PCRF selected by the gateway if the IP addresses of the terminal as seen by the gateway and the application entity AF are different. It is clear to the person skilled in the art that, PCRF selection being based on the IP address, this method cannot cover the situation in which the operator seeks to retain the same PCRF in mobility scenarios in which the user changes IP address during the same session.

Last but by no means least, that method has the drawback of impacting on the overall performance of the system, especially in operator networks deploying many PCRF entities because, as already stated, the application function AF systematically attempts to select a potential PCRF until the PCRF selected by the gateway is selected.

OBJECT AND SUMMARY OF THE INVENTION

The present invention proposes a solution that does not have the above-mentioned drawbacks.

The invention is based on the use of a database accessible in an IMS network and including at least one record including:

an identifier of a terminal in a transport plane;
an identifier of said terminal in a signaling plane; and
at least one address of a quality of service and charging control entity in said network.

A PCRF entity constitutes in particular a quality of service and charging control entity in the sense of the invention. Below, such an entity is referred to as a PCRF entity or more often simply as a PCRF.

An SPDF entity for a fixed access network also constitutes a quality of service and charging control entity in the sense of the invention.

In a first variant of the invention, the database is connected to each gateway and to each application entity AF of the network of the operator.

There is no restriction on the format of this database.

Similarly, the protocol used by the gateways and the AF application entities to interrogate this database is left to the choice of the operator.

In this first variant, the addresses of the PCRF entities can be stored in the database either permanently or temporarily.

The database contains the following data for each IMS subscriber:

an identifier of the user in the transport plane, for example their International Mobile Subscriber Identifier (IMSI) or their Mobile ISDN (MISDN); and an identifier of the user in the application signaling plane, for example their private identity or the public identity of the IMS user.

The database associates the address of the PCRF entity that manages the terminal having these two identifiers.

The database can optionally contain, for a given user, different PCRF addresses as a function of the types of access to which the user subscribes.

If the database includes a temporary PCRF address, namely an address assigned dynamically by the gateway for the duration of a session, the database further contains an identifier of the current session.

It is clear to the person skilled in the art that the identifier of the session is obligatory if the operator seeks to select a PCRF in each session but of no utility if the operator uses the same PCRF for all a user's sessions.

Storing the PCRF entities has a plurality of advantages.

Firstly, the operator centralizes management of the PCRF entities of their network in the database, which is easier to maintain than a local configuration of the PCRF addresses associated with each gateway and each application entity AF.

In the situation of permanent storage, the operator can furthermore modify the assignment of the PCRF entities at any time to improve the distribution of users over the various PCRF entities of the network, for example if a new PCRF is introduced into the network to balance the number of users per PCRF.

In a second variant of the invention, the database of the invention is connected directly to each of the PCRF entities using an interface and a protocol left to the choice of the operator.

This database then serves as a relay between the PCRF contacted when setting up a session and the PCRF contacted to set up resources for that session. The database contains the address of each PCRF entity for a session, the PCRF entities being selected independently at the application entity AF level and the gateway level. These selections can in particular be made randomly or deterministically taking account of the access type.

In this solution, operators can therefore configure their network flexibly since they can in particular connect different PCRF entities for different access types (i.e. for different gateway types).

In this second variant, the PCRF entities are not necessarily connected to all the gateways and to all the application functions AF in the operator's network.

In this variant the database contains the following data for each IMS subscriber:
  an identifier of the user in the transport plane, constituting permanent data, for example their IMSI or their MSISDN, or temporary data, for example the IP address of the user in the transport plane;
  an identifier of the user in the application signaling plane, constituting permanent data, for example a private identity or a public identity of the IMS user, or temporary data, for example the IP address of the user in the application signaling plane;
  the address of the PCRF selected by the gateway; and
  the address of the PCRF selected by the application entity AF.

These two addresses constitute temporary data valid for the duration of the session.

The database also contains the identifier of the current session, constituting temporary data that is also valid for the duration of the session.

The service information for the current application session is optionally also stored in the database, constituting temporary data that is also valid for the duration of the application session.

This second variant is advantageous if the identifier of the user in the transport plane and his identifier in the signaling plane are different.

The database of the invention is able to associate these two identifiers, either because the data is static and stored permanently or because the data is dynamic but associated with the same session.

Both variants are suitable in the situation in which the operator uses different IP addresses in the transport plane and the application signaling plane for the same user.

They are suitable in particular in a mobility situation, even if a terminal changes application function or gateway and IP address during a session.

The invention also relates to a gateway and an application entity that can be used in the first variant of the invention if the address of the PCRF is stored permanently.

This gateway includes means for receiving a request to set up a session at the transport level sent by a terminal in an IMS network. It includes:
  means for sending a database as defined above a request including an identifier of said terminal in a transport plane; and
  means for obtaining an address of a quality of service and charging control entity in said network in response to said request.

The application entity includes means for receiving a request to set up a session in the signaling plane sent by a terminal in an IMS network. It also includes:
  means for sending a database as defined above a request including an identifier of said terminal in a signaling plane; and
  means for obtaining an address of a quality of service and charging control entity in said network in response to said request.

In one embodiment, the above-mentioned requests sent by the gateway and by the application entity AF also indicate the type of access used by the terminal.

To obtain the address of a PCRF entity for a session involving a terminal, the gateway and the application entity of the invention send the database of the invention a request including an identifier of the terminal in the transport plane and in the signaling plane, respectively.

The invention is also directed to a gateway and an application entity that can be used in the first variant if the address of the PCRF is stored temporarily.

To be more precise, this gateway includes means for receiving a request to set up a session at the transport level sent by a terminal in an IMS network. It also includes:
  means for selecting a quality of service and charging control entity in the network; and
  means for sending a resource activation message to a database as defined above, said request including the address of said entity, an identifier of said terminal in a transport plane, and a session identifier.

Thus the gateway selects a PCRF in the network, for example randomly or as a function of a type of access to the network used by the terminal, and sends the address of that PCRF to the database for storage.

In one embodiment, to obtain the address of this PCRF, the application entity sends the database a request including the identifier of the terminal in the signaling plane and the identifier of the session. The database is able to correlate the session identifier received at the application signaling level by the application entity AF with the session identifier received at the transport level by the gateway GW.

In one particular embodiment of the first variant of the invention, the gateway also includes:
  means for sending a database as defined above a message to release resources, the request including an identifier of the terminal in the transport plane and a session identifier. The database then deletes the address of the PCRF and the session identifier for the terminal.

This embodiment is particularly advantageous when the address of the PCRF is stored temporarily.

The invention is also directed to a quality of service and charging control entity that can be used in the second variant, for example a PCRF entity or a SPDF entity.

This entity includes means for receiving a request for initialization of a session relating to a terminal. It also includes means for sending a database as defined above a message containing the address of this entity, a session identifier, and a terminal identifier.

Thus when it is contacted by a gateway, the PCRF or SPDF entity of the invention contacts the database of the invention to transmit its address, the identifier of the terminal in the transport plane, and the session identifier. The database associates this PCRF address and this session identifier with the identifier of the terminal in the transport plane.

When it is contacted by an application entity AF, the PCRF or SPDF entity of the invention contacts the database of the invention to send its address, the identifier of the terminal in the application signaling plane, the session identifier, and optionally session information.

The database associates this PCRF address and optionally the service information for this session with the identifier of the terminal in the application signaling plane. The database is able to correlate the session identifier received at the application signaling level by the application entity AF with the session identifier received at the transport level by the gateway GW.

The identifiers of the terminal are created in the database if they are not permanent.

There are two options in the second embodiment of the invention according to whether the operator seeks to store service information in either the PCRF entities or the database of the invention.

In one particular embodiment, the control entity of the invention includes:
  means for sending a database as defined above a request including an identifier of said session and an identifier of a terminal in a transport plane; and
  means for obtaining service information on said session, either directly from a response to said request or by interrogating another quality of service and charging control entity at an address contained in a response to said request.

These two options enable the operator to store the service information in either the PCRF entities or the database of the invention. If the service information is stored in a PCRF, the database can, to communicate it to a second PCRF, either obtain it for itself from the first PCRF (Proxy mode) or give the second PCRF the address of the first PCRF (Redirect mode). In Redirect mode, the first PCRF contacts the second PCRF to obtain the service information for the session, which requires an interface between the PCRF entities.

In one embodiment of the second variant of the invention:

The gateway also includes means for sending the database a message to release the resources of the session, the request including an identifier of the terminal in the transport plane and a session identifier.

The application entity AF also includes means for sending the database a message to release resources of the session, the request including an identifier of the terminal in the application signaling plane and a session identifier.

The database then deletes the address of the PCRF in the application signaling plane and, if the data is temporary, the identifier of the terminal in the application signaling plane, and also the service information for the variant in which it is stored in the database.

The invention also provides a method of obtaining an address of a quality of service and charging control entity in an IMS network. This method includes a step of sending a database as defined above a request including one session identifier and one terminal identifier.

In one particular embodiment, the various steps of the method of obtaining addresses are determined by computer program instructions.

Consequently, the invention further provides a computer program on an information medium, which program is adapted to be executed in a device for obtaining addresses or more generally in a computer, this program including instructions adapted to execute the steps of a method as described above of obtaining addresses.

This program can use any programming language and take the form of source code, object code or a code intermediate between source code and object code, such as a partially-compiled form, or any other desirable form.

The invention further provides a computer-readable information medium containing instructions of a computer program as referred to above.

The information medium can be any entity or device capable of storing the program. For example, the medium can include storage means, such as a ROM, for example a CD ROM or a micro-electronic circuit ROM, or magnetic storage means, for example a floppy disk or a hard disk.

Moreover, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit incorporating the program and adapted to execute the method in question or to be used in its execution.

BRIEF DESCRIPTION OF THE DRAWINGS

Other features and advantages of the present invention emerge from the description of the invention given below and with reference to the appended drawings, by way of non-limiting example, in which FIGS. 1 to 7 illustrate a first variant of the invention and FIGS. 8 to 14 illustrate a second variant of the invention.

To be more precise:

DESCRIPTION OF A FIRST VARIANT OF THE INVENTION (FIGS. 1 to 7)

Figure 1:
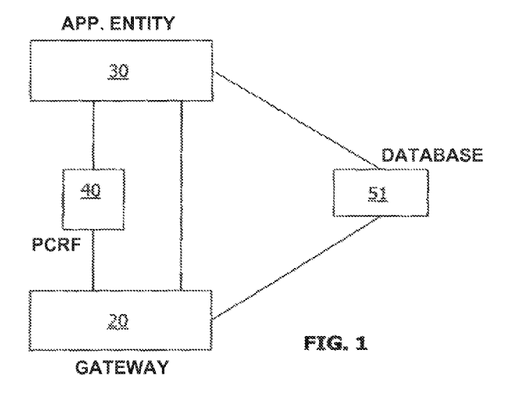
FIG. 1 represents in their environment a gateway and an application entity of a first variant of the invention.

FIG. 1 shows:

a Gateway 20 of the Invention;

an application entity AF 30 of the invention;

a database 51 of the invention; and a prior art PCRF entity 40.

In this first variant, the database 51 of the invention is accessed by the gateway 20 and by the application entity AF 30.

As known in the art:

the interface between the PCRF entity 40 and the application entity AF 30 is an interface of the Rx type;

the interface between the PCRF entity 40 and the gateway 20 is an interface of the Gx type; and the interface between the application entity AF 30 and the gateway 20 is an interface of the Gi/Wi type.

Figure 2:
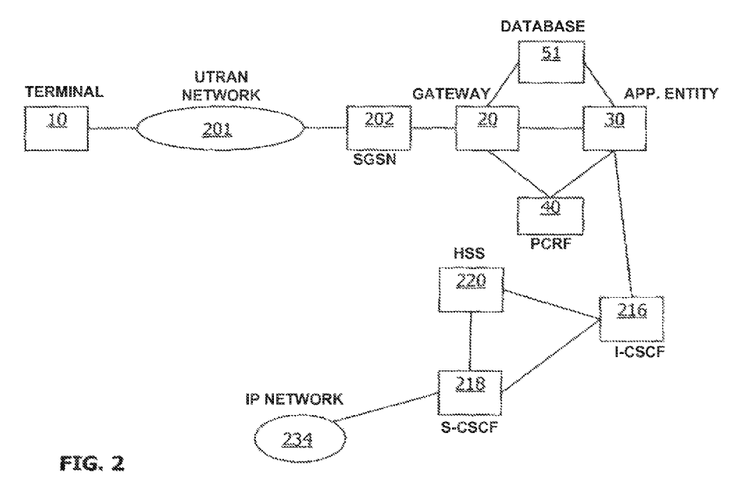
FIG. 2 shows this first variant in the context of a UMTS network.

FIG. 2 shows one embodiment of the first variant of the invention in the context of a UMTS network.

In this figure, a terminal 10 is attached to a Serving GPRS Support Node (SGSN) 202 via a UTRAN network 201 which itself communicates with the gateway 20 of the invention, namely in this example a Gateway GPRS Support Node (GGSN) gateway.

The GGSN gateway 20 of the invention communicates with an application entity 30 of the invention, here a Proxy-Call Session Control function (P-CSCF) entity.

The GGSN gateway 20 of the invention and the P-CSCF entity 30 of the invention are connected to a PCRF entity 40 and to a database 51 of the invention, as shown in FIG. 1.

In the embodiment described here, the P-CSCF entity 30 of the invention communicates with an Interrogating-Call Session Control Function (I-CSCF) entity 216 the principal object of which is to interrogate the Home Subscriber Server (HSS) 220 to identify the location of the Serving-Call Session Control Function (S-CSCF) entity 218 serving the terminal 10.

This entity 218 manages the session on the IMS network and in particular the interface with other networks of the IP 234 network type.

For more information on the architecture of the UMTS network, see the UMTS specification documents available at http//:www.3gpp.org, in particular the document TS 23.228.

There is described below with reference to FIGS. 3 and 4 the exchange of messages in one embodiment of the first variant of the invention in which the address of the PCRF 40 is stored permanently in the database 51.

Figure 3:
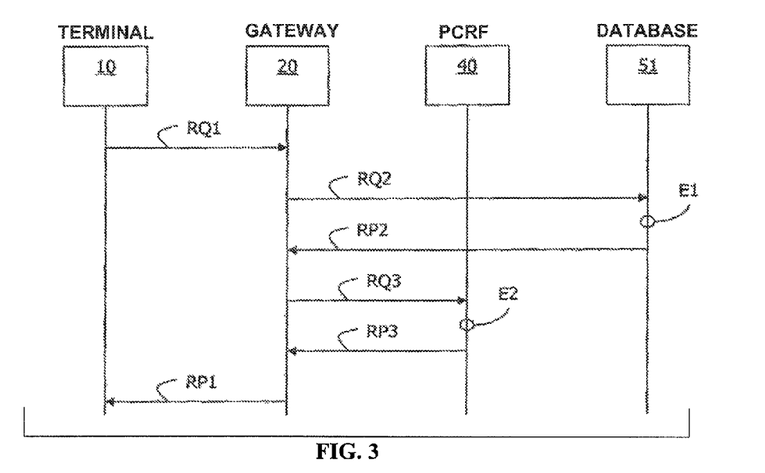
FIGS. 3 and 4 represent the exchange of messages to set up a session (at the transport level and at the application level, respectively) in a first embodiment of the first variant of the invention.

FIG. 3 represents an adaptation of the IP-CAN session set-up procedure defined by the document TS 23.203 to incorporate the invention.

It is assumed in this example that the terminal 10 sends a request RQ1 to the gateway 20 of the invention to set up a transmission link (for example a signaling link). This message can be of the "IP-CAN Bearer Request" type.

On receiving this request RQ1, the GGSN gateway 20 of the invention sends a request RQ2 to the database 51 of the invention.

That request includes the identifier in the transport plane of the terminal sending the request RQ1 and optionally the type of access to the IMS network that this terminal uses.

On receiving the request RQ2, the database 51 of the invention looks up the address of the PCRF entity 40 associated with this terminal identifier or with the pair (terminal identifier, type of access used by the terminal).

The database 51 then sends in response to the request RQ2 a message RP2 including the identifier of the user in the transport plane and the address of the PCRF 40.

The session is then set up in a manner known in the art, as summarized here:

The GGSN gateway 20 of the invention sends the PCRF 40 from which it previously obtained the address a request RQ3 asking for a quality of service and charging decision.

On receiving this request RQ3, the PCRF entity 40 executes a decision step E2 and then sends the gateway 20 the decision in a response RP3.

It is clear to the person skilled in the art that the request RQ3 can be of the "Indication of IP-CAN Session Establishment" type and that the response RP3 can be of the "Acknowledged IP-CAN Session Establishment" type.

On receiving the response RP3, the gateway 20 accepts the request for activation of the transmission channels (for example the PDP context in GPRS) and sends a response RP1 to the terminal 10 to notify it of this.

Figure 4:
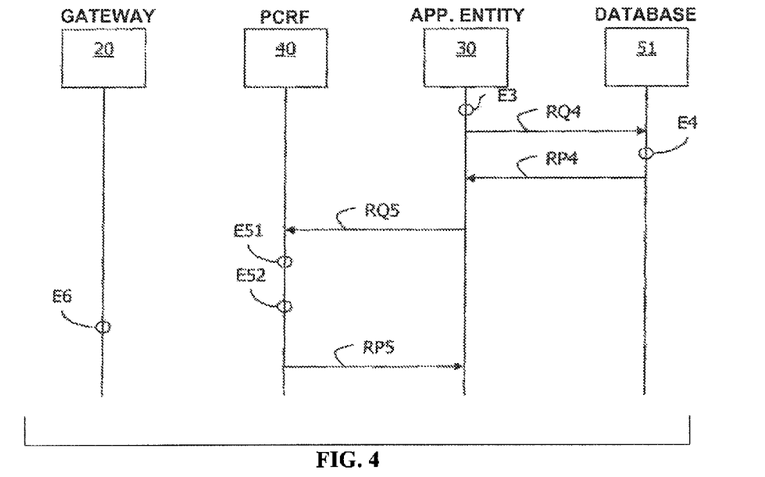

FIG. 4 represents an adaptation of the AF session set-up procedure defined in the document TS 29.213 to incorporate the invention.

It is considered that during a step E3 the application entity AF 30 of the invention receives from the terminal 10 a request to set up a session, typically an SIP Invite message.

On receiving this message, the application entity 30 defines the necessary service information.

In this embodiment of the invention, the application entity AF 30 sends the database 51 a request RQ4 including the identifier of the user in the application signaling plane and possibly the access type.

During a step E4, the database 51 looks up the address of the PCRF entity 40 in the database 51 as a function of the identifier of the user and where applicable the access type.

Once this address has been identified, the database 51 of the invention sends the application entity 30 a response RP4 including the identifier of the user in the application signaling plane and the address of the PCRF entity 40.

The rest of the procedure is familiar to the person skilled in the art.

In particular, the application entity 30 sends the PCRF entity 40 a request RQ5, namely, in the embodiment described here, an Authorization Applicant Request (AAR) conforming to the Diameter protocol.

On receiving this request, the PCRF 40 stores the service information during a step E51 and then identifies the concerned sessions of the transport plane during a step E52.

The PCRF can then interact with the gateway 20 during a general step E6 to send the QOS and charging rules if the PCRF is in push mode (the interactions described above with reference to FIG. 3 are applied after the message RFP5 during activation of the resources if the PCRF is in pull mode).

The PCRF 40 sends a response message PR5 to the application entity 30, namely, in the example described here, an Authorization Application Answer (AAA) response conforming to the Diameter protocol.

An embodiment of the first variant of the invention in which the address of the PCRF 40 is stored temporarily in the database 51 is described below with reference to FIGS. 5 and 6.

Figure 5:
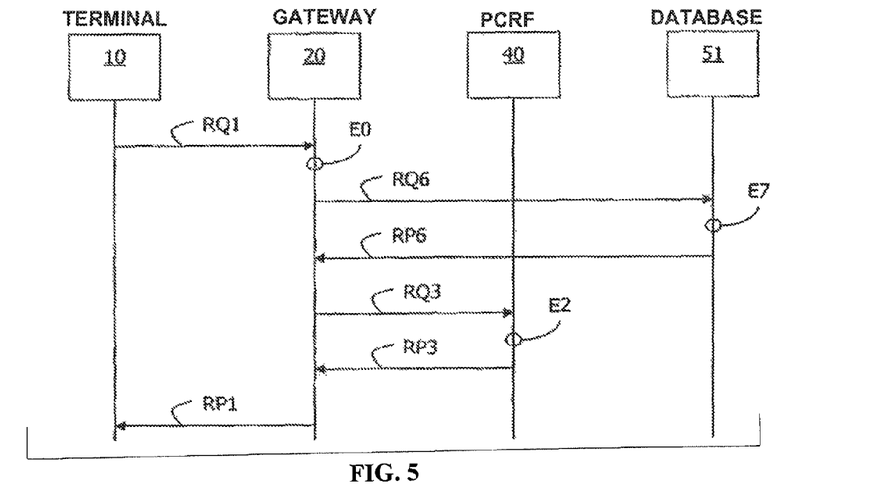
FIGS. 5 and 6 represent the exchange of messages to set up a session (at the transport level and at the application level, respectively) in a second embodiment of the first variant of the invention.
Figure 6:
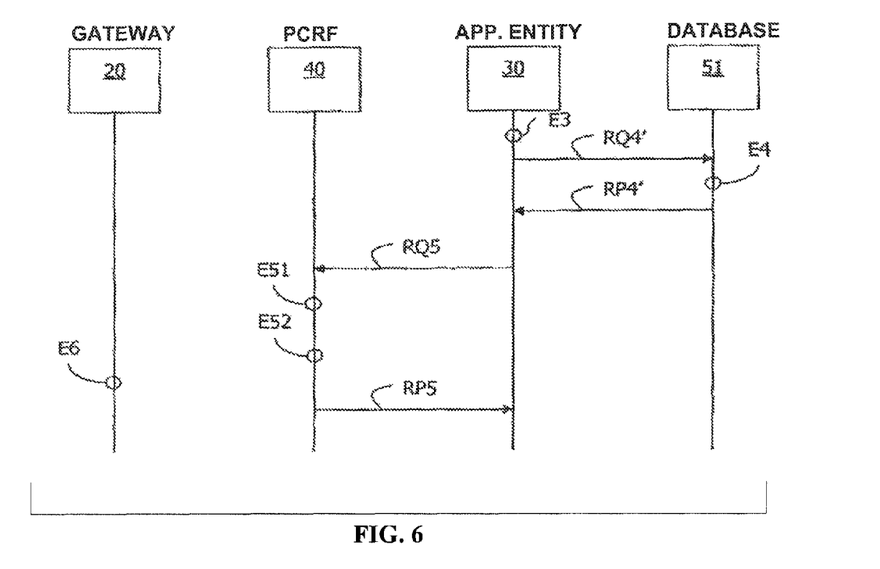

FIGS. 5 and 6 respectively represent an adaptation of session set-up as defined in the documents TS 23.203 and TS 29.213 to incorporate this embodiment.

When the gateway 20 receives the request RQ1 to set up a signaling transmission link already described, it selects a PCRF entity of the network during a step E0. This entity can be selected randomly, for example.

The gateway 20 then sends the database 51 a request RQ6 including the identifier of the user in the transport plane, the address of the PCRF chosen in the step E0, and a session identifier.

In the embodiment described here the database 51 stores the address of the PCRF and the session identifier during a step E7.

The database 51 then sends the gateway 20 a response RP6 including the identifier of the user in the transport plane and the session identifier.

Session set-up then continues as in the prior art and as described above with reference to FIG. 3.

Referring to FIG. 6, when the application entity AF 30 receives the session set-up request (SIP Invite message) it sends the database 51 a request RQ4' including the identifier of the user in the application signaling plane but also the session identifier, which is needed because the address of the PCRF 40 is temporary for this session.

As described above, using this information, the database 51 identifies the address of the PCRF 40 and returns the address of the PCRF 40 together with the identifier of the user in the application signaling plane and the session identifier to the application entity 30 in a response message RP4'.

The rest of the session set-up procedure proceeds in a manner known in the art and as described above with reference to FIG. 4.

Figure 7:
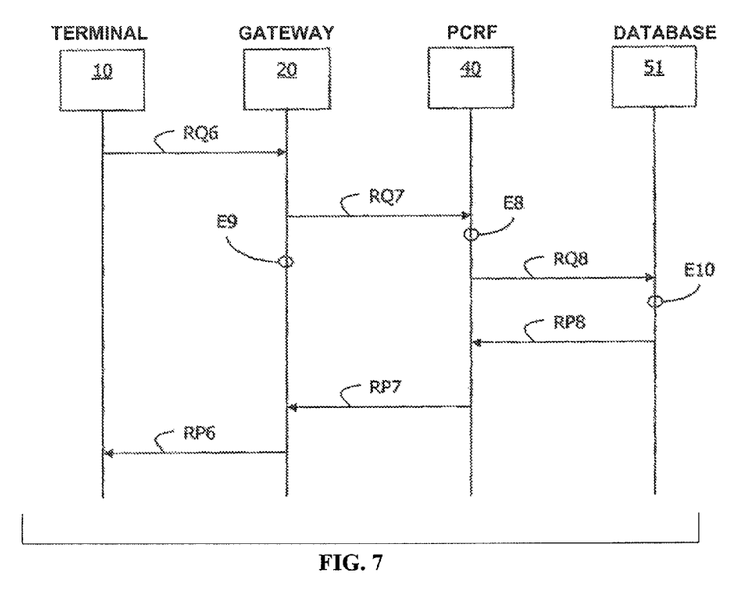
FIG. 7 represents the exchange of messages for terminating a session in the first variant when the addresses of the PCRF entities are stored temporarily in the database of the invention.

FIG. 7 represents adaptations to the IP-CAN session termination procedure defined in the document TS 29.213.

It is assumed here that the gateway 20 of the invention receives from the terminal 10 a request RQ6 to end the session. This request RQ6 can be of the "Remove IP-CAN Bearer Request" type.

In a manner known in the art, receiving such a request RQ6 triggers the sending of an indication message RQ7 to the PCRF 40. This message RQ7 can be of the "Indication of IP-CAN Session Termination" type.

As in the prior art, the PCRF entity 40 identifies which rules are affected by this termination request during a step E8. The gateway destroys all these rules during a step E9.

According to the invention, the PCRF entity 40 sends the database 51 a request RQ8 to delete the address of the PCRF and the session identifier for this user.

This request RQ8 includes the identifier of the user in the transport plane and the session identifier.

Once these operations have been effected, the database 51 sends the PCRF 40 a response message RP8. In a manner known in the art, the PCRF 40 sends a response RP7 to the gateway 20. This response RP7 can be a message of the "Acknowledge IP-CAN Session Termination" type.

The gateway 20 then acknowledges the request RQ6 sent by the terminal 10 by sending a message RP6. This response RP6 can be a message of the "Remove IP-CAN Bearer Response" type.

DESCRIPTION OF A SECOND VARIANT OF THE INVENTION (FIGS. 8 to 14)

Figure 8:
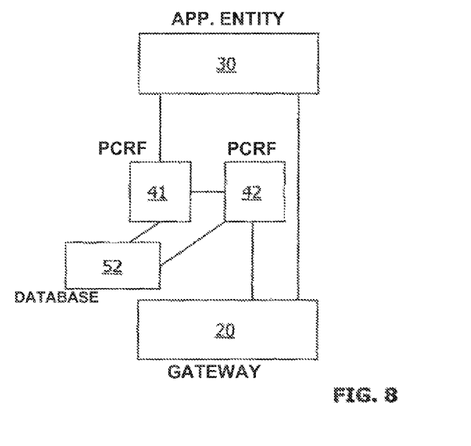
FIG. 8 represents in their environment PCRF quality of service and charging control entities of a second variant of the invention.

FIG. 8 represents in their environment PCRF quality of service and charging control entities 41, 42 of a second variant of the invention.

If these Figures are Compared to FIGS. 1 and 2 described above, it is seen that the database 52 of the invention is connected directly to the PCRF entities 41 and 42 and that the gateway 20 (GGSN) and the application entity 30 (P-CSCF) each use a different PCRF 42, 41.

Figure 9:
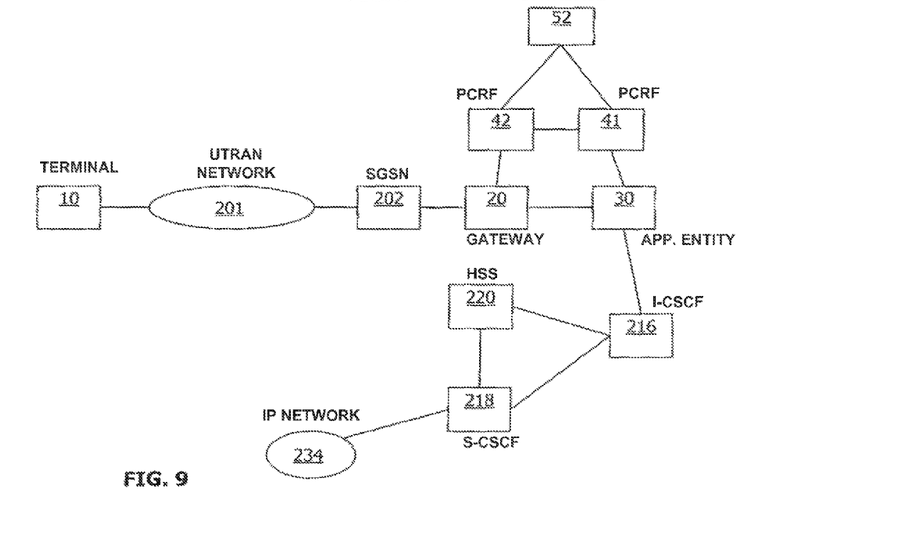
FIG. 9 shows this second variant in the context of a UMTS network.

FIG. 9 shows an embodiment of the first variant of the invention in the context of a UMTS network.

Figure 10:
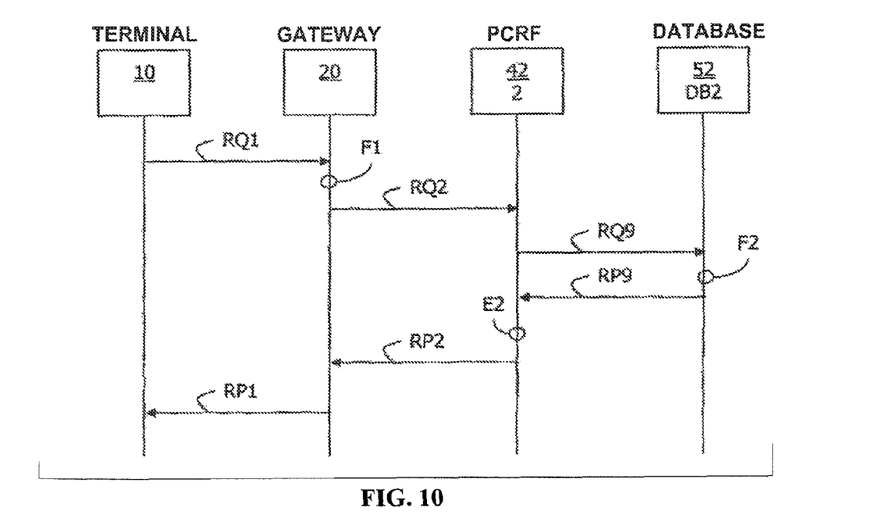
FIGS. 10 to 14 represent the exchange of messages for setting up a session in various embodiments of the second variant of the invention.

FIG. 10 shows an adaptation of the IP-CAN session set-up procedure defined in the document TS 29.213 to incorporate this second variant of the invention.

When the gateway 20 receives a request RQ1 to set up a signaling transmission link, it selects a PCRF entity 42 during a step F1 and stores its address in association with the user identifier and the session identifier.

Then, in a manner known in the art, the gateway 20 sends this PCRF entity 42 a request RQ2 to indicate the setting up of a session.

In this variant, the PCRF entity 42 sends a database 52 of the invention a request RQ9 including the identifier of the user in the transport plane, the address of the PCRF entity 42, and the session identifier.

During a step F2, the database 52 stores the address of the PCRF entity 42, the identifier of the session for the user, and the identifier of the user in the transport plane if that data is not permanent.

The database 52 then sends the PCRF entity 42 a response message RP9.

The rest of the procedure proceeds in the standard manner (see FIG. 3).

In particular, during a step E2, the PCRF entity 42 chooses its decision policy and then sends the gateway 20 a message RP2 to acknowledge the request RQ2.

The gateway 20 sends the terminal 10 a message RP1 to acknowledge the session set-up request RQ1.

Figure 11:
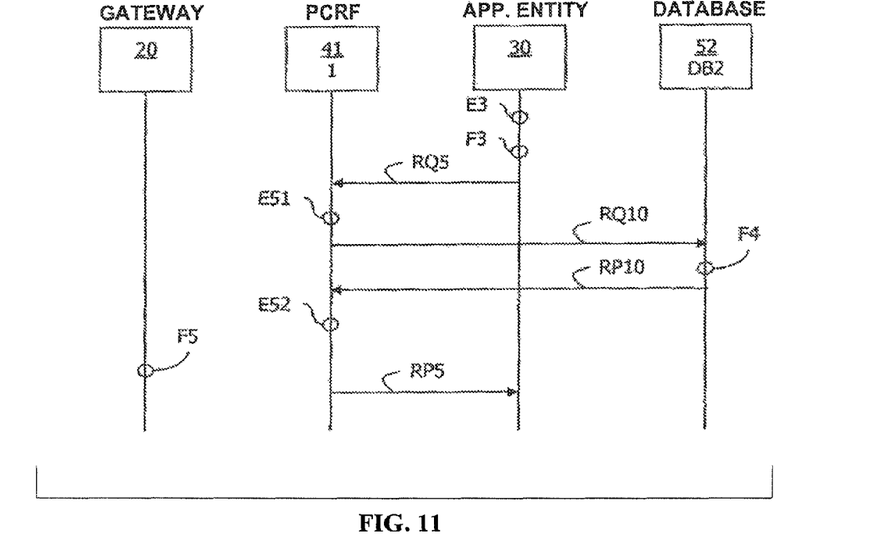

Referring to FIG. 11, it is assumed that, during a step E3, the application entity 30 of the invention receives a session set-up request coming from the terminal 10.

On receiving this request, the application entity 30 defines the necessary service information and then selects a PCRF entity 41 during a step F3 and stores its address in association with the user identifier and the session identifier.

Then, as described above (see FIG. 4), the application entity 30 sends the PCRF entity 41 a request RQ5, namely a Diameter AAR message in this example.

On receiving this request, the PCRF entity 41 stores the service information during a step E51.

In this embodiment of the invention, the PCRF entity 41 sends the database 52 a request RQ10 including the address of the PCRF entity 41, the identifier of the user in the signaling plane, the session identifier, and optionally the service information.

During a step F4, on receiving the request RQ10, the database 52 stores this information for the user and the session, i.e. at least the address of the PCRF 41 (the service information being optional and the identifier of the user possibly being permanent data that is already present).

The database 52 then sends the PCRF entity 41 a message RP10 to acknowledge the request RQ10.

The PCRF entity 41 can identify the transport plane sessions concerned during a step E52, as described above.

Then, during a general step F5, the gateway 20 effects the actions described above with reference to FIG. 10.

The response of this second variant of the invention to the terminal 10 requesting reservation of resources for the newly set-up session is described below.

Three embodiments of this second variant of the invention are envisaged and are described below with reference to FIGS. 12, 13, and 14, respectively.

Figure 12:
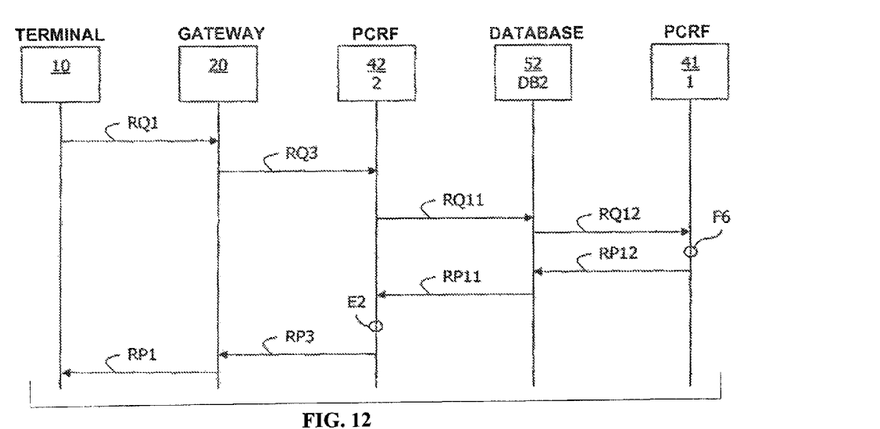
Figure 13:
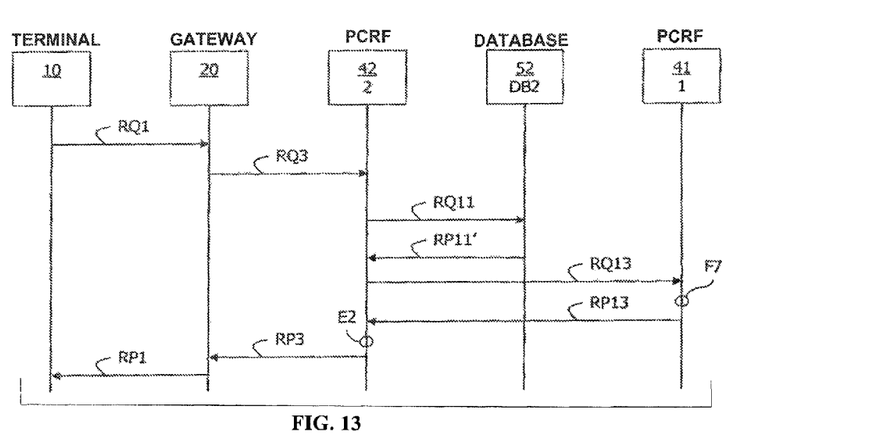

In the embodiments of FIGS. 12 and 13, the service information is sent to the PCRF 42 from the PCRF 41, either via the database DB 52 in Proxy mode (FIG. 12) or directly in Redirect mode (FIG. 13).

Figure 14:
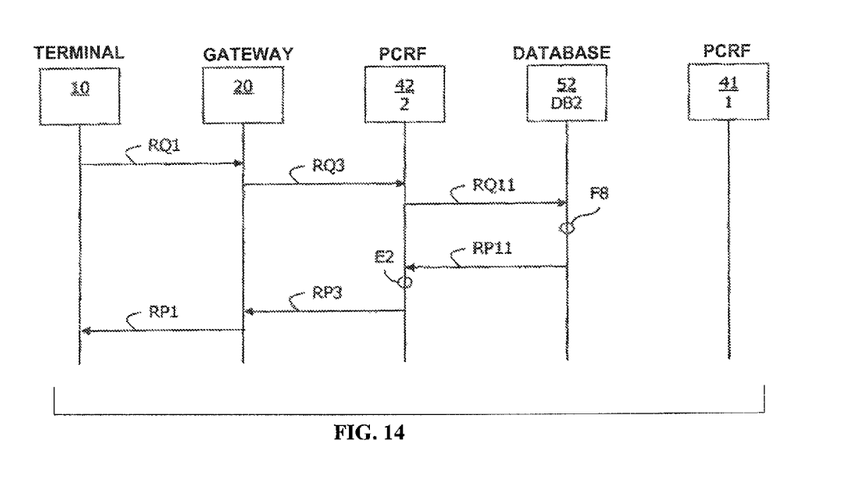

In the embodiment of FIG. 14, this service information is transmitted from the database 52.

These three embodiments start the same way: the terminal 10 sends a resource activation request RQ1 of the "Establish IP-CAN Bearer Request" type to the gateway 20, which sends the PCRF entity 42 a request RQ3 of the "Indication of IP-CAN Session Establishment" type.

On receiving this request RQ3, to obtain the service information the PCRF entity 42 sends the database 52 a request RQ11 indicating the identifier of the user in the transport plane and the session identifier.

This request is processed differently according to the embodiment concerned.

1. Proxy Mode (FIG. 12)

In this embodiment, the database 52 contacts the PCRF 41, sending in its request the identifier of the user in the signaling plane and the session identifier.

In pull mode, during a step F6, the PCRF 41 retrieves the service information for this user and this session. The PCRF 41 responds to the database 52 (message RP12), its response containing the service information for the user and the requested session.

The database 52 responds (message RP11) to the PCRF 42 with the identifier of the user and the service information relating to the session.

In another embodiment (step F5 in FIG. 11), in push mode, the PCRF 42 spontaneously sends a request to the database 52, which redirects it to the PCRF 41.

2. Redirect Mode (FIG. 13)

In this embodiment, the database responds to the PCRF 42, giving it the address of the PCRF 41 (message RP11'). The PCRF entities 41 and 42 are connected to each other.

In pull mode, the PCRF 42 contacts the PCRF 41 (request RQ13), sending it the identifier of the user in the signaling plane and the session identifier. The PCRF 42 can store locally for future use the address of the PCRF 41 linked to the user identifier and the session identifier.

During a step F7, the PCRF 41 retrieves the service information for this user and sends it to the PCRF 42 in a response RP13.

In another embodiment, in push mode, the PCRF 41 spontaneously sends the PCRF 42 the service information after obtaining its address from the database.

The PCRF 42 spontaneously sends a request to the database 52.

3. Service Information Stored in the Database 52 (FIG. 14)

In this embodiment, the database 52 itself retrieves the service information for this user and this session (step F8). The database 52 responds to the PCRF 42 with the identifier of the user and the service information relating to the session (message RP11).

In the three examples described here, the PCRF 42 thus obtains the requested service information either from the PCRF 41 or from the database 52.

Be this as it may, during a step E2 already described, it establishes its QOS and charging policy and then sends a message RP3 of the "Acknowledged IP-CAN Session Establishment" type in response to the request RQ3.

The gateway 20 can send a message RP1 of the "Establish IP-CAN Bearer Response" type in response to the request RQ1.

In a similar way to what has been described with reference to FIG. 7, to terminate an IP-CAN session, the PCRF 42 contacts the database 52 with the user identifier and the session identifier.

To end the session in the transport plane, the database 52 deletes the address of the PCRF 42 for the user. It also deletes the user identifier in the transport plane if that data is temporary.

The gateway 20 deletes the user identifier, the session identifier, and the address of the PCRF 2 that were stored for the session.

In the Redirect mode described with reference to FIG. 13, the PCRF 42 deletes the user identifier, the session identifier, and the address of the PCRF 41 if this information was stored for the session.

To terminate the session in the application signaling plane, the database 52 deletes the address of the PCRF 41 and where necessary the service information for the user and the session.

The database 52 also deletes the user identifier in the signaling plane if that data is temporary.

The application entity 30 deletes the user identifier, the session identifier, and the address of the PCRF entity 41 stored for the session.

The gateway 20 and the application entity 30 described above have the hardware architecture of a conventional computer.

They include ROM in which a computer program of the invention is stored. When it is executed, this program executes instructions of a method of the invention for obtaining an address.

That method includes in particular sending the database 51 a request RQ2, respectively RQ4, including at least a data among a session identifier and an identifier of the terminal 10 in the signaling plane or the transport plane and possibly the access type.

The gateway 20 and the application entity 30 obtain the address of the PCRF entity 40 from the database 51 in response to their requests RQ2, RQ4, respectively.

The PCRF entity 42 described above has the hardware architecture of a conventional computer.

It includes ROM storing a computer program of the invention. When it is executed, this program executes instructions of a method of the invention for obtaining an address.

In response to its request RQ11 the PCRF entity 42 obtains the address of the PCRF entity 41 from the database 52 in Redirect mode or the service information in Proxy mode.

The invention is also directed to a database accessible in an IMS network and including at least one record including:
  at least one identifier of a session in the transport plane;
  at least one address of a quality of service and charging control entity in said network; and
  means for sending said address of the control entity in response to receiving a request including an identifier of said session in the signaling plane.

The session identifier can be in the transport plane or the signaling plane.

This database does not contain the user identifier.

This embodiment is usable only if the user is not in a mobility situation.

The invention claimed is:

1. A database accessible in an IMS network, said database comprising means for storing at least one record including:
   an identifier of a terminal in a transport plane;
   an identifier of said terminal in a signaling plane; and
   at least one address of a quality of service and charging control entity in said network which manages said terminal,
   wherein the database is configured to send a message including said at least one address of the quality of service and charging control entity for a session involving said terminal to a gateway of the network in response to a request including the identifier of said terminal in the transport plane sent by said gateway; and
   wherein the database is configured to send a message including said at least one address of the quality of service and charging control entity for said session to an application entity in response to a request including the identifier of said terminal in the signaling plane sent by said application entity.

2. The database according to claim 1, wherein said record further includes a session identifier.

3. The database according to claim 1, wherein said record further includes service information on a session in said network.

4. The database according to claim 1, wherein the database is configured to obtain service information on a session in said network by interrogating a quality of service and charging control entity in said network.

5. A method of obtaining an address of a quality of service and charging control entity in an IMS network, comprising sending a request, including at least one identifier of a requesting terminal, to a database wherein said database is accessible in an IMS network and wherein said database comprises at least one record stored therein, said at least one record comprising:
   an identifier of a terminal in a transport plane;
   an identifier of said terminal in a signaling plane; and
   at least one address of a quality of service and charging control entity in said network which manages said terminal,
   wherein the database is configured to send a message including said at least one address of the quality of service and charging control entity for a session involving said terminal to a gateway of the network in response to a request including the identifier of said terminal in the transport plane sent by said gateway; and
   wherein the database is configured to send a message including said at least one address of the quality of service and charging control entity for said session to an application entity in response to a request including the identifier of said terminal in the signaling plane sent by said application entity.

6. A computer program including instructions for executing a method of obtaining an address when said program is executed by a computer wherein said method of obtaining an address comprises sending a request, including at least one identifier of a requesting terminal, to a database comprising a component configured to store at least one record including:
   an identifier of a terminal in a transport plane;
   an identifier of said terminal in a signaling plane; and
   at least one address of a quality of service and charging control entity in said network which manages said terminal,
   wherein the database is configured to send a message including said at least one address of the quality of service and charging control entity for a session involving said terminal to a gateway of the network in response to a request including the identifier of said terminal in the transport plane sent by said gateway; and
   wherein the database is configured to send a message including said at least one address of the quality of service and charging control entity for said session to an application entity in response to a request including the identifier of said terminal in the signaling plane sent by said application entity.

7. A computer-readable storage medium storing a computer program comprising instructions for executing a method of obtaining an address wherein said method of obtaining an address comprises sending a request, including at least one identifier of a requesting terminal, to a database comprising a component configured to store at least one record including:
   an identifier of a terminal in a transport plane;
   an identifier of said terminal in a signaling plane; and
   at least one address of a quality of service and charging control entity in said network which manages said terminal,
   wherein the database is configured to send a message including said at least one address of the quality of service and charging control entity for a session involving said terminal to a gateway of the network in response to a request including the identifier of said terminal in the transport plane sent by said gateway; and
   wherein the database is configured to send a message including said at least one address of the quality of service and charging control entity for said session to an application entity in response to a request including the identifier of said terminal in the signaling plane sent by said application entity.

8. A database accessible in an IMS network, said database being configured to store at least one record including:
   an identifier of a terminal in a transport plane;
   an identifier of said terminal in a signaling plane; and
   at least one address of a quality of service and charging control entity in said network,
   wherein the database is configured to send a message including said at least one address of the quality of service and charging control entity for a session involving said terminal to a gateway of the network in response to a request including the identifier of said terminal in the transport plane sent by said gateway; and
   wherein the database is configured to send a message including said at least one address of the quality of service and charging control entity for said session to an application entity in response to a request including the identifier of said terminal in the signaling plane sent by said application entity.

9. The database according to claim 8, wherein said record further includes a session identifier.

10. The database according to claim 8, wherein said record further includes service information on a session in said network.

11. The database according to claim 8, comprising means for obtaining service information on a session in said network by interrogating a quality of service and charging control entity in said network.

* * * * *